United States Patent Office

2,830,092
Patented Apr. 8, 1958

2,830,092

METHOD FOR THE CONVERSION OF ORTHO ESTERS TO ACETALS

Carl J. Claus, Rochester, N. Y., and John L. Morgenthau, Jr., Newtonville, Mass., assignors, by mesne assignments, to the United States of America as represented by the Secretary of the Navy No Drawing. Original application September 30, 1952, Serial No. 312,416. Divided and this application November 21, 1956, Serial No. 623,715

3 Claims. (Cl. 260—615)

The present invention concerns a convenient, general method for reducing aliphatic nitriles to the corresponding aldehydes, and more particularly, a process for the reduction of an ortho ester to an acetal. This is a division of our copending application, Serial No. 312,416, filed September 30, 1952, for Method for the Conversion of Nitriles to Aldehydes, issued U. S. Patent No. 2,786,872.

Aldehydes are useful, among other things, in the manufacture of chemicals, dyes, intermediates, disinfectants, and in organic synthesis and medicine. Transformation of aliphatic nitriles to aldehydes was previously accomplished by three practical methods, namely, pyrolysis, the Stephen reduction and the Rosemund reduction. In the pyrolysis method, the nitrile is hydrolyzed to a carboxylic acid. Then a mixture of carboxylic acid and formic acid (or the calcium or barium salts) are pyrolyzed in the presence of a metallic oxide catalyst, the equations being:

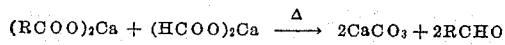

or

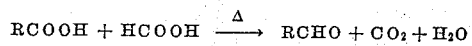

The formation of calcium carbonate on pyrolyzing the mixture of salts (or of carbon dioxide in the case of the mixture of acids) can take place in the above two ways, giving rise to a mixture of a ketone and an aldehyde. However, the yields of aldehydes are very poor.

The Stephen reduction consists of treating a nitrile in dry ether with anhydrous stannous chloride and hydrogen chloride gas. An intermediate aldimine, stannic chloride complex, is formed, which can be hydrolyzed to the aldehyde, the equation being:

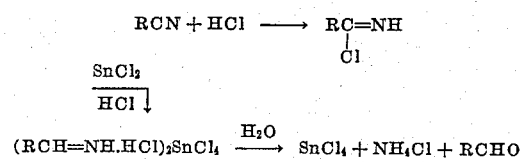

This method is not as general as is claimed. The yields are highly variable with different nitriles and in some instances no yield at all is produced.

The Rosemund reduction involves the hydrogenation of an acid chloride with palladium-barium sulphate as a catalyst. The acid chloride must first be prepared from a nitrile by hydrolysis to the acid, then treated with phosphorus pentachloride or thionyl chloride, the equation being:

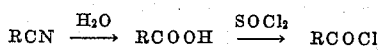

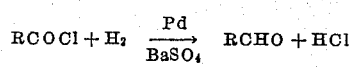

In order to accomplish this reduction, high pressure equipment is required and the yield of aldehyde varies greatly.

An object of the invention is to provide a process for the conversion of aliphatic nitriles to aldehydes wherein the above mentioned disadvantages are eliminated.

Another object of the invention is to provide a process for the conversion of nitriles to aldehydes that yields a stable acetal of the aldehyde as the end product.

Other objects and many of the attendant advantages of this invention will be readily appreciated as the same becomes better understood by reference to the following detailed description.

The subject method for the conversion of aliphatic nitriles to aldehydes involves a hitherto unknown reaction of lithium aluminum hydride, the reduction of an ortho ester to an acetal. A nitrile is treated with alcohol in the presence of hydrogen chloride under anhydrous conditions to yield the imino ether hydrochloride. Such imino ether hydrochloride is then alcoholyzed to the corresponding ortho ester. Treatment of the ortho ester wtih lithium aluminum hydride yields the acetal, said acetal being readily hydrolyzed to the aldehyde in the presence of an acid, the equation being:

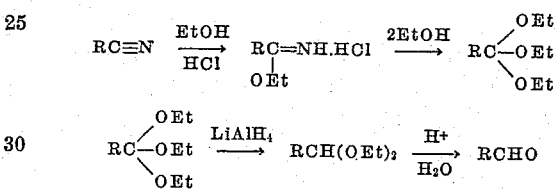

A specific method of reducing aliphatic nitriles to the corresponding aldehydes was developed in the course of an investigation of a synthesis of methionine-α-C¹⁴. It was desired to prepare β-methylmercaptopropionaldehyde in good yield from cyanide-labeled β-methylmercaptopropionitrile.

Methyl and ethyl ester of ortho-β-methylmercaptopropionic acid were obtained from β-methylmercaptopropionitrile, according to McElvain's procedure described in the Journal of the American Chemical Society, vol. 64, page 1824, 1942, by S. M. McElvain and J. W. Nelson. Methyl ester, 57.6% yield, B. P. 51–52° (1 mm.). (Calculated for $C_7H_{16}O_3S$: C, 46.59; H, 8:89. Found: C, 46.98; H, 8.68.) Ethyl ester, 65.5% yield, B. P. 71–72° (0.8 mm.). (Calculated for $C_{10}H_{22}O_3S$: C, 53.98; H, 9.90. Found C, 54.35; H, 9.89.) The following method was then used to reduce the ortho esters to the corresponding acetals:

One quarter of a molar equivalent of lithium aluminum hydride (1 M ether solution) was added to a boiling solution (0.33 M) of the ortho ester in benzene. The mixture was refluxed four hours. The complex was decomposed with Rochelle salt solution (30%) and the benzene extract was dried and distilled.

Both methyl and ethyl acetals of β-methylmercaptopropionaldehyde were obtained in good yield. Dimethyl acetal, 97% yield, B. P. 73° (0.9 mm.). (Calculated for $C_6H_{14}O_2S$: C, 46.98; H. 9.33. Found: C, 47.11; H, 8.95.) Diethyl acetal, 73% yield, B. P. 68–74° (0.7 mm.). (Calculated for $C_8H_{18}O_2S$: C, 53.84; H, 10.12. Found: C, 54.13; H, 9.81.) The acetals produced by this process are readily hydrolyzed to β-methylmercaptopropionaldehyde. The 2,4-dinitrophenylhydrazone (M. P. 119.5–120.5°) was prepared from each acetal. Mixed melting points with an authentic sample showed no depression.

Apparently this reduction is of general applicability since the orthoformic, orthacetic, and orthovaleric ethyl esters, prepared from the nitriles, were converted to the corresponding acetals in good yields.

Aliphatic aldehydes prepared by the aforementioned procedure are obtained as stable acetals, which are not subject to deterioration because of condensation and polymerization. These acetals can be purified conveniently and safely by distillation without loss of material, before converting them to the more sensitive aldehydes. Only standard organic laboratory equipment without high temperature or high pressure techniques is required to practice this invention. The pyrolysis, Stephen reduction and Rosemund reductions yield directly the aliphatic aldehydes, which are more difficult to handle because of their extreme reactivity.

It is contemplated that ortho esters prepared from alcohols other than methyl and ethyl alcohol can be substituted in the above procedure, the equation being

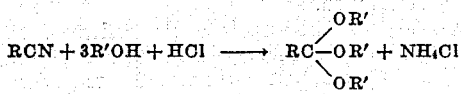

where R is an alkyl radical and R' is either an alkyl or aryl group. Mixed ortho esters can be used in which R' groups differ from one another. Also, under proper conditions, other metal hydrides (such as lithium borohydride or sodium borohydride) will reduce ortho esters to acetals.

From the foregoing it is seen that a metal hydride can reduce an ortho ester to an acetal, said process of converting a nitrile to an aldehyde yielding a stable acetal of the aldehyde as an end product.

Obviously many modifications and variations of the present invention are possible in the light of the above teachings. It is therefore to be understood that within the scope of the appended claims the invention can be practiced otherwise than as specifically described.

What is claimed is:

1. The process for the preparation of the ethyl acetal of formaldehyde from its corresponding ortho ester comprising the steps of adding lithium aluminum hydride to a boiling solution of such ortho ester in benzene, refluxing said mixture and decomposing the complex.

2. The process as defined in claim 1 wherein the acetal is the ethyl acetal of acetaldehyde.

3. The process as defined in claim 1 wherein the acetal is the ethyl acetal of valeraldehyde.

References Cited in the file of this patent

Claus et al.: Jour. Amer. Chem. Soc., vol. 73 (1951), p. 5005.